United States Patent [19]

Sun et al.

[11] Patent Number: 5,050,102

[45] Date of Patent: Sep. 17, 1991

[54] APPARATUS FOR RAPIDLY SWITCHING BETWEEN OUTPUT DISPLAY FRAMES USING A SHARED FRAME GENTIFICATION MEMORY

[75] Inventors: Szu-Cheng Sun, Mountain View; Serdar Ergene, San Jose, both of Calif.

[73] Assignee: Sun Microsystems, Inc., Mountain View, Calif.

[21] Appl. No.: 345,211

[22] Filed: Apr. 28, 1989

[51] Int. Cl.[5] .......... G06F 15/62

[52] U.S. Cl. .......... 364/521; 340/725

[58] Field of Search .......... 364/521, 522; 340/734, 340/725

[56] References Cited

U.S. PATENT DOCUMENTS

| | | | |
|---|---|---|---|
| 4,550,315 | 10/1985 | Bass et al. | 364/522 X |
| 4,769,762 | 9/1998 | Tsujido | 364/521 |
| 4,823,108 | 4/1989 | Pope | 364/521 X |
| 4,829,453 | 5/1989 | Katsuta et al. | 364/521 |
| 4,852,024 | 7/1989 | Kurakake et al. | 364/521 |
| 4,907,174 | 3/1990 | Priem | 364/521 |

*Primary Examiner*—Gary V. Harkcom
*Assistant Examiner*—Mark K. Zimmeran
*Attorney, Agent, or Firm*—Blakely Sokoloff Taylor & Zafman

[57] ABSTRACT

An apparatus for rapidly switching between output display frames using a shared frame identification memory is disclosed which has particular application to high resolution graphics for animation. Through a plurality of comparison circuitry, the apparatus enables a frame to be displayed during the clock cycles when the frame identification memory is read and during the clock cycles when the frame identification memory is provided with input, thereby, allowing a frame identification memory to be shared by two output display memories. As a result the rapid switching between output display frames sufficient for animation may be achieved with less hardware.

11 Claims, 4 Drawing Sheets

| | INPUT FID REG. | FID MEM | DSP 1 BIT | OUTPUT FID REG | CRT DIS/MEM A/B | BACK-GROUND |
|---|---|---|---|---|---|---|
| 1 | ? | 000 | 0 | 000 | | X |
| 2 | → 001 | | | | | |
| 3 | | → 000 | 0 | 000 | | X |
| 4 | | 001 | 1 | | | X |
| 5 | | 000 | 0 | → 001 | | X |
| 6 | | 001 | 1 | | X | |
| 7 | → 010 | | | | | |
| 8 | | 000 | 0 | | | X |
| 9 | | → 001 | 1 | 001 | X | |
| 10 | | 010 | 0 | | | X |
| 11 | | 010 | 1 | | X | |
| 12 | | 000 | 0 | | | X |
| 13 | | 001 | 1 | → 010 | | X |
| 14 | | 010 | 0 | | X | |
| 15 | | 010 | 1 | | X | |
| 16 | → 011 | | | | | |
| 17 | | other | ? | | | X |
| 18 | | 010 | 0 | | X | |
| 19 | | → 010 | 1 | 010 | X | |
| 20 | | 011 | 0 | | | X |
| 21 | | 011 | 1 | | X | |
| 22 | | other | ? | | | X |
| 23 | | 010 | 0 | | | X |
| 24 | | 010 | 1 | → 011 | | X |
| 25 | | 011 | 0 | | X | |
| 26 | | 011 | 1 | | X | |
| 27 | 100 | 011 | 1 | 011 | X | X |

FIG. 3

Display Select Logic

| A | B | C | D |
|---|---|---|---|
| 0 | 0 | X | 0 |
| 1 | X | X | 1 |
| 0 | 1 | 0 | 0 |
| 0 | 1 | 1 | 1 |

D = 0 : Background color
D = 1 : Display memory

FIG. 4

APPARATUS FOR RAPIDLY SWITCHING BETWEEN OUTPUT DISPLAY FRAMES USING A SHARED FRAME GENTIFICATION MEMORY

BACKGROUND OF THE INVENTION

1. Field of the Invention

The present invention relates to logic circuitry and, more particularly, to logic circuitry used to provide extremely rapid switching between output display frames in a computer system.

2. Discussion of the Prior Art

As computer systems such as work stations have grown more and more sophisticated, it has become clear that they might be conveniently utilized for providing the animation features that one associates with motion pictures and television. A computer which is capable of providing an animated output offers a distinct advantage over television and motion pictures because it, unlike the others, allows both the construction and revision of the images of animated displays. The ability of computers to provide three dimensional displays has hastened and heightened the desire for system which are capable of handling animated subjects.

A major problem in utilizing computers to provide animated output is that animation requires the display of frames which vary by small increments and succeed one another in rapid sequence. In order to display a single frame of graphical material on a cathode ray tube (CRT), it is necessary to store an indication of the information for each position (pixel) which is to appear on the output display. With large and detailed displays, the number of pixels on a cathode ray tube may average approximately one thousand in a horizontal direction and a like number in the vertical direction giving a total of approximately one million pixels about which information needs to be stored for each frame. In a preferred system which is capable of providing a number of different colors and hues on the cathode ray tube, twenty-four bits of digital information specifying the particular color output are stored for each pixel of the display. Consequently, approximately twenty-four million bits of information need to be stored for each frame to be presented at the output. This requires a substantial amount of time.

Moreover, not only does writing the approximately twenty-four million bits for each frame require a substantial amount of time, but the clearing of those bits in order to present the next frame requires an additional amount of time. Some of the delay between frames has been obviated by using double buffered systems in which two full screen bitmapped display memories are provided and switched alternately to the cathode ray tube output. Such a system reduces substantially the time between presentation of two frames of information but does not eliminate the need to clear each of the display memories so that it may be written with the color information for the frames which follow. Consequently, even such double buffered systems are too slow to provide optimum outputs for animation purposes.

An arrangement for decreasing the delay between individual frames is described in copending U.S. patent application Ser. No. 07/254,957, Apparatus for Rapidly Clearing the Output Display of a Computer System, Joy et al., filed Oct. 7, 1988, and assigned to the assignee of the present invention. This arrangement decreases the delay by essentially eliminating the time normally used for clearing the display memories in such a system. The system accomplishes this by providing full frame double-buffered bitmapped memories in which are stored indications that the information in the same position of an associated display memory part of in a particular frame. These memories are referred to as frame identification memories or buffers. Consequently each position representing a pixel in the twenty-four bit display memory has an associated, corresponding position in a four bit frame identification memory which identifies it by frame number.

When a frame which has been written into the display memory is to be read out, an output frame identification register is given the number of the frame to be read out; and that frame number is compared with the value of each position in the frame identification memory as the frame identification memory and the display memory are scanned for cathode ray tube refresh. Only those pixels which are in the selected frame are provided as output from the display memory to the cathode ray tube. At display memory positions at which the frame number in the output frame identification register and the number in the frame identification memory do not compare, a background color generator is activated to provide background color to the display. This allows frame-to-frame writing to the display memory to continue without clearing the display memory while clearing only a small portion of the frame identification memory. This dramatically reduces the intra-frame delay.

However, even this new arrangement offers an area for improvement because, even though the twenty-four bit display memories need not be cleared between frames, the pair of four bit frame identification memories must be cleared, either completely or in portions, before the next frame may be written. Moreover, although the use of frame identification memories allows the system to operate without clearing the larger display memories, it does add a significant amount of additional memory hardware to the computer system for use as frame buffer memory.

It is, therefore, an object of this invention to improve the speed at which images may be switched from frame to frame and presented at the output of a computer system.

It is another object of this invention to substantially reduce the delay associated with clearing frame identification memories between frames in a computer system.

It is another object of this invention to reduce the amount of memory hardware required to implement a frame identification memory in a computer system.

An additional object of this invention is to improve the speed at which computer systems operate.

SUMMARY OF THE PRESENT INVENTION

The foregoing and other objects of this invention are accomplished by a computer output system comprising a first full screen pixmapped memory, a second full screen pixmapped memory, apparatus for providing input signals for writing information to be displayed by an output device to each position of the first memory, apparatus for storing in the second memory the positions of each position of the first memory to be written to the output device, and apparatus for comparing the signal stored at each position of the first memory and the signal stored at the same position of the second memory to determine whether information at the position is to be written to the output device.

These and other features and advantages of the present invention will become apparent to those skilled in the art after having read the following detailed description in conjunction with the several figures of the drawing in which like elements have been referred to by like designations throughout the several views.

IN THE DRAWINGS

FIG. 3 is a table useful in illustrating the operation of the arrangement shown in FIG. 2.

FIG. 4 is a truth table illustrating the flow of signals in the arrangement of the invention shown in FIG. 2.

DETAILED DESCRIPTION OF THE DRAWINGS

1. Prior Art Frame Identification System

Figure 1:
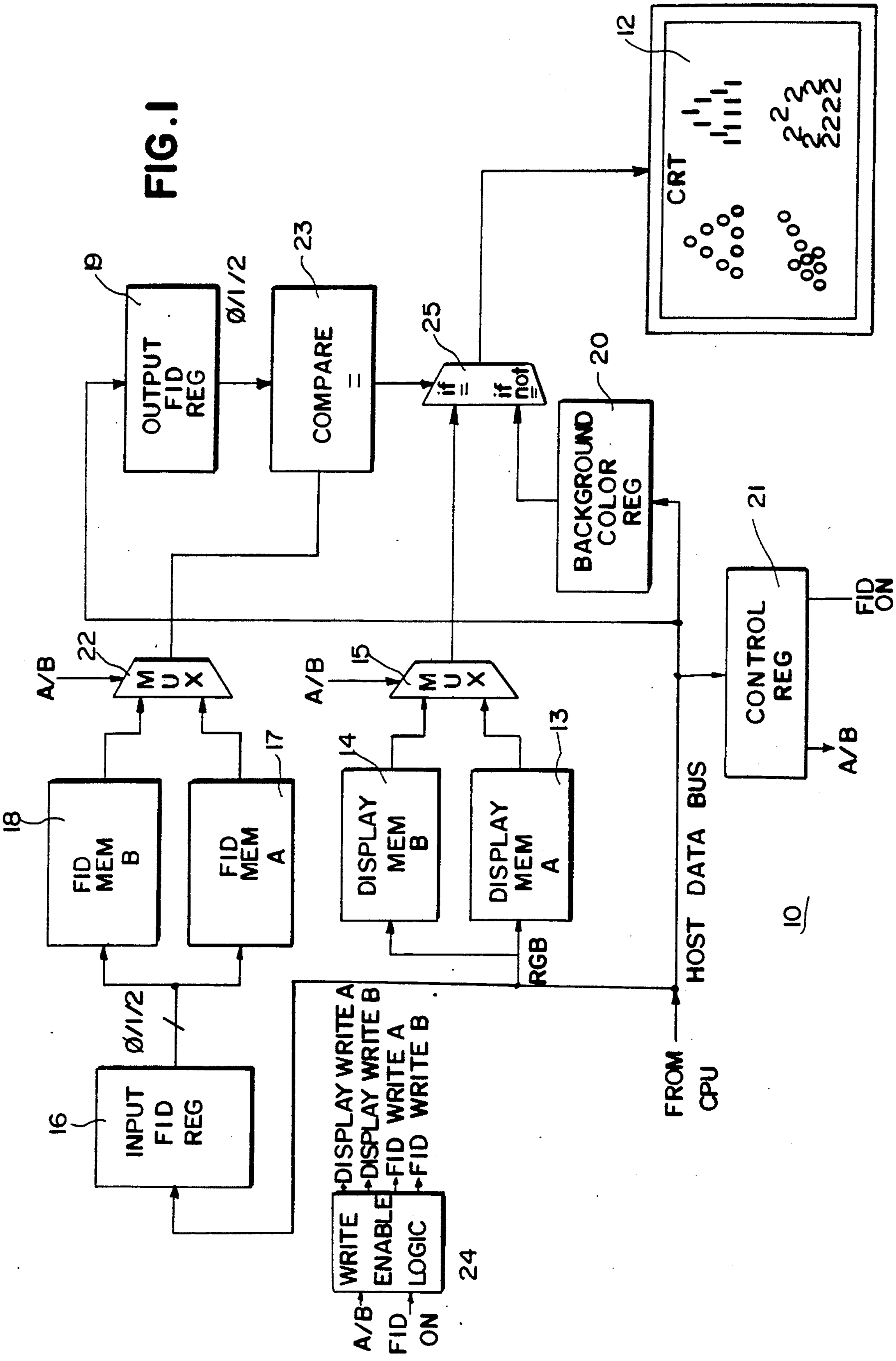
FIG. 1 is a block diagram illustrating a prior art arrangement for selecting individual frames to be displayed on a computer output device.

Referring now to FIG. 1, there is shown a display output system 10 for processing information rapidly; this system is disclosed in the above-mentioned copending patent application. For the purposes of this explanation, a frame means a particular graphical or data structure which it is desired to present as a full screen presentation on a cathode ray tube or other computer output device. The system 10 operates under control of a central processing unit (CPU) not shown in FIG. 1.

When it is desired to write a particular graphic frame to an output device such as the cathode ray tube (CRT) 12 shown in FIG. 1, the actual information to be displayed is written to a display memory. The system 10 comprises a first display memory 13 and a second display memory 14. The use of two display memories in parallel, the output of which may be selected by a multiplexer 15, allows the rapid switching between frames of a display which is necessary to accomplish animation. In the usual case in which the system is used for animation, a frame is written to display memory A while the frame in display memory B is being furnished as output to the cathode ray tube 12. The information in the frame in display memory A is then furnished as output to the cathode ray tube 12 while a new frame is written to display memory B.

To obviate the loss of time incident to clearing the large display memories and provide the switching speed necessary for animation, the output system 10 of the copending application also includes an input frame identification (FID) register 16, a pair of frame identification (FID) memories 17 and 18, an output frame identification (FID) register 19, a background color register 20, and a control register 21. The system 10 also includes a multiplexer 15 for selecting one of the display memories, a multiplexer 22 for selecting one of the frame memories, a comparator circuit 23, a write enable logic circuit 24, and a logic circuit 25. It should be noted that the frame memories 17 and 18 are labeled A and B, respectively; they are each associated with the similarly labeled one of the display memories 13 (A) and 14 (B).

The operation of the system 10 is as follows. The CPU writes a value to the control register 21 using the host data bus to select to which of the FID memories 17 or 18 and its associated display memory 13 or 14 it is to write. The CPU then provides a frame identification number which is stored in the input frame identification register 16; this number is used for all of the information to be written for this frame. In a preferred system, sixteen frame numbers (0–15) are utilized. After the input frame identification register has been initialized with the frame number, the actual information to be displayed on the output device is sent from the CPU to the selected full screen bitmapped display memory 13 or 14. The frame identification memories 17 and 18 are also full screen bitmapped memories, each receiving input from the input FID register 16 and providing outputs to the multiplexer 22 so that signals may be rapidly switched for the presentation of animated graphic images.

Each piece of input information on the host data bus from the CPU carries a pixel address and color information (an RGB color value, for example). Presuming that the display memory A and the FID memory A have been selected, the RGB color value is written to the appropriate pixel address in display memory A while the frame identification number is written to the same pixel address in the frame identification memory A. In a preferred system, the frame identification number requires four bits of storage while the RGB color value requires twenty-four bits of storage at each pixel.

Consequently, when any particular full frame has been written to display memory A, the display memory A contains, at the addressed positions chosen for the particular frame, the representation to be displayed in RGB color values while the frame identification memory contains the frame numbers stored at the same pixel addresses.

When it is time to display a particular frame, the CPU, using the host data bus, stores the selected frame identification number in the output frame identification register 19. The CPU also writes to the control register 21 so that the multiplexers 22 and 15 controlling the outputs of the frame identification memories and the display memories, respectively, are set to select the output from memories A. Then, as each pixel position in the display memory A is scanned to the output through its associated multiplexer, the frame identification value is also scanned from the frame identification memory A for that pixel position. The comparator circuit 23 compares the output of the selected frame identification memory and of the output frame identification register 19 and provides a signal indicating those pixel positions of the frame identification memory A where the selected frame has been written; this causes the RGB color signal stored at those positions of the display memory A to be furnished to the cathode ray tube by the logic circuit 25. At all pixel positions other than those properly identified by the frame identification memory A, the comparator circuit 23 provides an output causing a background color to be furnished by the background color register 20 and transferred to the cathode ray tube 12.

This arrangement for processing signals has a number of significant advantages. For example, the system requires that color values be stored in the display memories only at positions indicative of foreground data. Background colors need not be stored in the display memories. Consequently, storage of information may proceed at a more rapid rate than with the usual system where twenty-four bits of information must be stored at each pixel. More importantly, a display memory need not be erased after the information for a frame is read out in order to write the next frame in that memory.

For example, after a first frame has been processed as explained above, the next frame to be processed by the particular FID memory has a different frame number so information written to the associated display memory is simply written on top of the information already stored because the only information which will ultimately be furnished to the display for a particular frame is the information associated with the selected frame number.

It should be noted that the output system described with respect to FIG. 1 may conveniently be utilized in a computer system which makes full use of multiple windows and may also incorporate apparatus for providing output indicative of the depth of each pixel provided for a particular display on the cathode ray tube.

Although the use of FID memories and registers allows the system to function without clearing the display memories between particular frames, the number of bits utilized in the frame identification number system, four bits in the preferred case, determines how many total frames may be written before the FID memories themseleves must be cleared. With four bits of digital storage to record the frame number, sixteen total frames may be utilized. If the FID memories have not been cleared after sixteen frames, then it is possible that information relating to a previous frame will remain in an FID memory as the frame is again reached. Since this information might be erroneous, the system does require that the FID memories be cleared at least once in each sixteen uses.

An advantageous way of accomplishing the clearing without slowing the operation of the system to any extent is to clear at least one-fifteenth or greater of an FID memory after each frame is written to the output device. Such a system is described in the copending patent application.

In the preferred embodiment of the arrangement described which clears only one-fifteenth of the FID memories, the time utilized for clearing is substantially less than that required by prior art systems having equivalent display memories. Consequently, it is apparent that a system utilizing frame buffers is especially useful in providing the rapid switching necessary to animation.

2. The System of the Invention

Figure 2:
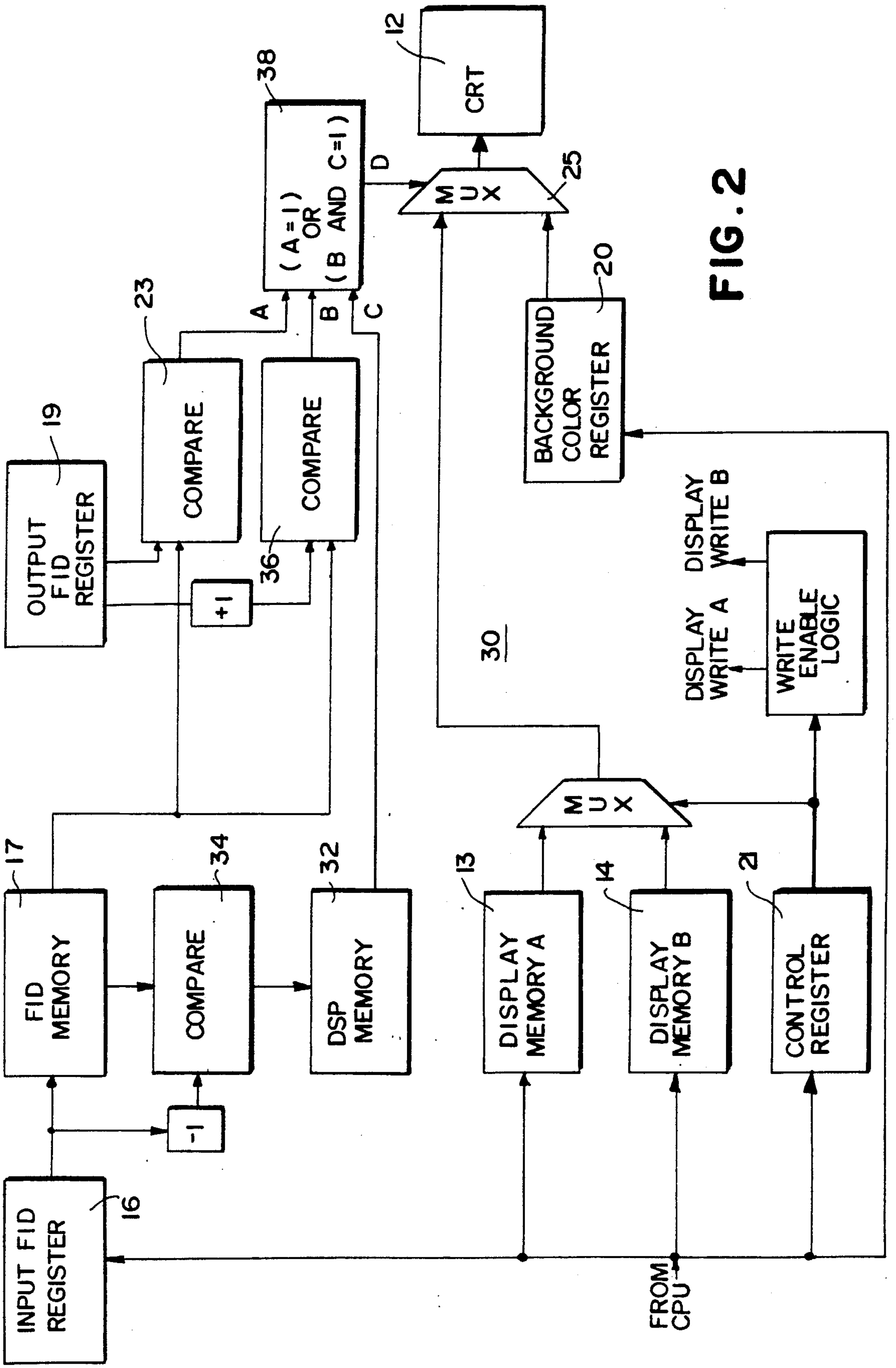
FIG. 2 is a block diagram illustrating an improved arrangement in accordance with the invention for selecting individual windows to be displayed on a computer output device.

Referring now to FIG. 2 there is shown an improved system for rapidly clearing the output display of a computer system. The system 30 shown in FIG. 2 includes a pair of display memories 13 and 14, an output multiplexer 15, an input frame identification register 16, an output frame identification register 19, a background color register 20, and an output multiplexer 25, all similar to those shown in the system 10 illustrated in FIG. 1. The system 30 also includes a single frame identification memory 17 instead of the double buffered frame identification memory of the system 10 shown in FIG. 1.

As with the system of FIG. 1, the display memories 13 and 14 are, in the preferred embodiment, each provided with twenty-four bits of storage at each position which represents a pixel on the output display 12. In contrast to the system disclosed in FIG. 1, the input FID register 16 and the output FID register 19 each include only three bits of storage at each position. Moreover, the frame identification (FID) memory 17 is provided with a similar three bits of storage at each position representing a pixel on the output display; otherwise, the frame identification memory 17 is essentially identical to either one of two frame identification memories 17 and 18 utilized with the system 10 shown in FIG. 1.

The FID memory 17 of the preferred embodiment of the present system 30, utilizes only three bits of memory for the because the clearing operation proceeds at such a rapid rate that it is not necessary to utilize sixteen individual frames in the FID memory 17. Three bits of memory allow a total of eight frames to be utilized, a number found to be sufficient and especially economical.

In attempting to reduce the amount of memory utilized from the doublebuffered full-screen pixmapped frame identification memories disclosed in FIG. 1 to the single frame identification memory used in the system 30 of this invention, a major problem is encountered. In order to be able to switch rapidly between display memories to present individual frames on the output display at a rate sufficient for animation purposes, it is necessary to write to one of the display memories and its associated frame identification memory while the information in the other frame display memory is being written to the output display. This requires that a comparison be made of the number stored in the output FID register and that at each of the pixel positions in the frame identification memory used with the display memory being written to the display at the same time that the new frame identification number is being written into the frame identification memory for the new frame being stored in the other display memory. Since this requires both writing to and reading from frame identification memories at the same time, the system 10 of FIG. 1 cannot simply utilize a single frame identification memory. That is, the system 10 of FIG. 1 cannot have its frame identification memory hardware reduced in size or be made more rapid by the simple expedient of using only a single frame identification memory.

This problem of both reading and writing to the same memory has been overcome in the present invention by logic circuitry which solves the problem of the need to both write to and read the same memory at the same time. The logic circuitry includes a full screen bitmapped display select plane (DSP) memory 32. The DSP memory 32 includes only a single bit of storage at each position representing a pixel on the output display 12. Signals are furnished to the DSP memory 32 from a comparator circuit 34. The circuit 34 compares each position in the FID memory 17 with the FID number stored in the input FID register 16 less one. A one is written to a position in the DSP memory 32 if the number in the FID register 16 is one greater than the number at the position in the FID memory 17 indicating that a next greater frame is being written to the display memory; otherwise, a zero is written to the position in the DSP memory 32.

Also added in the system 30 is a second comparator 36 which compares the frame identification number in positions of the FID memory 17 to the number stored in the output FID register 19 plus one. This comparator 36 produces a one if the number in the output FID register 19 is one less than the number in the compared position in the FID memory 17. Finally a comparator 23 compares the number in the output FID register 19 with the number at the position scanned in the FID memory 17 and produces a one if the numbers are equal.

The signals from the two output comparators 23 and 36 are each furnished to A and B input terminals, respectively, of an output logic circuit 38. Also furnished to a C input terminal of the output logic circuit 38 are the signals stored in each position of the DSP memory 32.

The output logic circuit 38 may include gating circuits or other logic well known to the prior art to provide an enabling output at an output terminal D if either the input signal provided at its input terminal A is a one or the both the input signals provided at the input terminals B and C are ones.

The effect of adding to the system 30 the DSP memory 32 and the two comparators 34 and 36, along with comparator 23 and the output logic circuit 38 is to cause signals to be provided on inout terminal D for operating the multiplexer 25 to cause information stored at a particular position in the selected one of the display memories 13 or 14 to be transmitted to the output display 12 when (1) the number at the same position in the frame identification memory 17 and the number stored in the output FID register 19 are equal and (2) during the next succeeding step of operation in which the new frame identification number is being written to the FID memory 17. In this manner, the output of a single display memory is furnished to the output display (1) during the clock period when it is scanned for refreshing the display 12 and a comparison is made between the number stored in the FID memory 17 and the number in the output register 19 and (2) during the following clock period in which the FID memory 17 receives the new frame identification number for the following frame. In this manner a single frame identification memory may be utilized in the system 30 thereby reducing the amount of memory utilized by the system 30 while increasing the speed with which frames are switched to the output. The particulars of the manner in which this is accomplished are explained hereinafter.

FIG. 3 is a table which illustrates the signals present in selected portions of the circuit of FIG. 2 during the operation of the system 30. The signals listed are those provided at the input FID register 16, the FID memory 17, the DSP memory 32, the output FID register 19, the display 12 from one of the display memories 13 or 14, and the display 12 from the background color register 20. The arrows in FIG. 3 indicate that a change is occurring at that particular point.

In the first line of the table of FIG. 3, the signals provided at each of these elements of the system 30 are shown as zeros. This represents the clearing state in which operation has not yet begun. At line 2, a new frame identification number 001 is furnished to the input frame identification register 16 from the CPU (not shown in FIG. 2). This is the frame number which is to be written to the frame identification memory 17 to identify the frame of the color (or other) information being written to the same positions in the associated display memory. During the clear condition, without information in the display memories, only background color is written to the output display 12.

At line 3 is illustrated a position in the FID memory 17 to which incoming information is not being written. Since no information is being written to this position, the DSP memory 32 is not affected at the particular position (which retains a zero). Line 4 represents a position in the FID memory 17 to which the new information is written. A comparison is first made in comparator 34 between the incoming 001 signal in the input FID register 16 and the 000 in the cleared position; and, the register 16 holding a frame number one less than the memory 17, a one is stored in the DSP memory position and the position in memory 17 is incremented by one to 001.

The comparator 23 also compares the number in the FID memory 17 with that stored in the output FID register 19. Since the output register 19 contains 000 in the example while the FID memory 17 contains 001 at each new position, this comparison does not enable the output logic circuitry 38.

At this same clock time, however, the comparator circuit 36 does provide an enabling signal to input terminal B of the circuit 38 since the output register 19 contains a number (000) one less than the 001 stored in the FID memory 17. Moreover, the same position of the DSP memory 32 also contains a one, so an enable signal is provided by the output logic circuit 38 at the output terminal D to operate the multiplexer 25. Consequently, signals from the selected display memory are furnished during this step to the output display 12. The display memory provides the background color because of its intial state.

In lines 5 and 6, the change in the output in response to the change of the frame identification number in the FID memory 17 from 000 to 001 is illustrated when the frame number in the output FID register 19 is changed to 001. As may be seen in line 5, the output displayed for any position which stores all zeros remains the background display. This may be confirmed by determining that the 000 stored in the FID memory 17 and the 001 stored in the output register 19 cause comparator circuit 23 to send a zero on the A input terminal to output logic 38 while the comparator circuit 36 which adds one to the number stored in the output register 19 and compares this result to the number in the FID memory 17 sends a zero to the output circuit 38 on the B terminal.

Line 6 of the table of FIG. 3 illustrates the result of the comparison of any position of the FID memory 17 which stores a 001 when the output FID register 19 also contains a 001. As is apparent, the comparator circuit 23 provides an equal signal (a one) at the terminal A to the output logic circuit 38 which causes the multiplexer 25 to furnish the output of the selected output display memory 13 or 14 to the output display 12.

Consequently, it is apparent that when a particular frame is written to a display memory 13 or 14 and the positions of that frame are also written to the frame identification memory 17, the system provides (1) the appropriate output to the display 12 for background memory when the output FID register 19 is not storing the same frame identification number as the position in the frame identification memory 17, and (2) the color information from the display memory when the FID memory 17 and the output register 19 store the same number at any particular position.

At line 7 of the table of FIG. 3, input FID register 16 is furnished frame identification number 010 preparatory to writing to the alternate one of the display memories 13 or 14. As explained above, it is necessary that the logic circuitry of system 30 continue to furnish the output to the display 12 which was being furnished during the period in which the FID memory 17 contained a frame identification number equal to that stored in the output frame identification register 19 during the time the new color information is being written to the second display memory. This is true even though the FID memory 17 is being overwritten. Lines 8 through 11, illustrate that correct signals are provided by the system 30 to cause this to occur, first, at any position of the FID memory 17 which holds 000 and, second, at any position which holds 001 when the signal in the input FID register 16 is changed to 010. At line 8, for example, a position in the FID memory holding 000 is compared with the 010 in the FID input register less 1 causing the comparator 34 to furnish a zero for each such position to the DSP memory 32. After the comparison, the number 010 is placed in the memory 17 and the DSP memory 32 retains a zero as shown at line 10. Since the output register 19 retains a 001 during this period (line 8), the comparator 23 provides a zero at terminal A and the comparator 36 provides a zero at terminal B. Consequently, as line 8 shows, background color is provided to the display 12.

Line 9 illustrates that for any position of the FID memory 17 holding a 001, on the other hand, a comparison with the number 010 in the input FID register 16 causes the comparator 34 to furnish a one to the like position in the DSP memory 32. After the comparison, the number 010 resides in the memory 17 and a one resides in the DSP memory as shown at line 11. Moreover, since that position of the FID memory 17 compares with the signal stored in the output FID register 19, the comparator 23 furnishes a one at terminal A of output logic circuit 38 and causes color information to be furnished from the display memory to the display 12.

At line 10, the FID memory 17 has received the new FID number 010 and the new color information is being written to the second display memory. At this point, the output FID register 19 still contains a 001 so a zero is provided at terminal A by the comparator circuit 23 which produces an enable only when the numbers are equal. On the other hand, the output register 19 contains a number one less than that stored at the particular position of the FID memory 17 so the comparator circuit 36 provides a one at the terminal B. Because the DSP memory 32 contains a zero at that position, the enabling condition of the circuit 38 is not met and background color is displayed at the display 12.

At line 11, a position of the FID memory 17 which previously contained 001 and now contains 010 is compared at the output circuitry. The comparator circuit 23 provides a zero at terminal A, and the comparator 36 provides a one at terminal B because the FID memory 17 holds a number one greater at that position than does the output register 19. In this case, however, this address of the DSP memory 32 contains a one because at line 9 the comparison by the comparator circuit 34 provided a one at that position. Consequently, the signals at the B and C terminals to the logic of circuit 38 are both enabling and a signal is provided at terminal D to cause the multiplexer 25 to furnish color information from the first display memory to the display 12.

Consequently, it may be seen that while information is written to the second display memory, information from the first display memory is still being presented to the output display 12 even though the FID memory 17 is being overwritten at that time.

Lines 12 through 15 illustrate the operation of the system 30 as the frame identification number stored in the output FID register 19 is changed to the number 010 reflecting the new frame stored in the second of the display memories 13 or 14. At this point, line 12 shows that at a position at which the FID memory 17 contains 000, the DSP memory 32 also contain a zero. Since, the number in the FID memory 17 is not the same as the number in the register 19, a zero is provided to circuit 38 on input terminal A. Since register 19 is not equal to one less than memory 17, the input at terminal B is zero so that background color is produced by the multiplexer 25.

At a position as shown at line 13 where the FID memory 17 contains 001, the DSP memory 32 contains a one and terminal C provides a one to the circuit 38. However, the numbers in the FID memory 17 and the FID register 19 do not compare and the frame number in the memory 17 is not one more than in the register 19 so the circuits 23 and 36 both provide zeros at terminals A and B to the circuit 38; this causes background color to be furnished to the display 12.

At line 14, a position of FID memory 17 containing the frame number 010 and at which the comparative position of the DSP memory 32 contains a zero produces color information from the display memory at the display 12 because the the numbers in the FID memory 17 and the FID register 19 do compare. In the same manner, line 15 illustrates that at any position of FID memory 17 containing a 010 and at which the same position of the DSP memory 32 contains a one, color information will also be furnished from the display memory to the output display 12 as in line 14.

At line 16 of the table of FIG. 3, the FID number in register 16 is changed to 011. As is illustrated at line 17, at any position to be changed and storing other than 010 in the FID memory 17, the comparator 34 causes the DSP memory 32 to store a zero. At this point background color will be furnished to the display 12 because neither terminals A or B carry ones to the circuit 38.

Lines 18 and 19 illustrates that any position storing a 010 in the FID memory 17 and either a zero or a one in the DSP memory 32 produces a color output from the display memory because the output register 19 carries the same number as the FID memory 17.

At line 20, the FID memory 17 receives the frame identification number 011 and the associated display memory 13 or 14 are written to. As shown on line 20, any position which previously stored other than a 010 receives a zero at that position in the DSP memory 32 as explained above regarding line 17. In such a situation, the output display 12 is furnished background color from the register 20 because the FID memory position neither compares with the number stored in the FID register 19 nor is a one furnished at the C terminal of the output logic circuit 38.

Line 21 illustrates that for each position of the FID memory 17 previously holding a 010 to which is written the FID number 011 and for which the associated position of DSP memory 32 receives, the circuitry produces a color output from the display memory. This occurs because the DSP memory 32 provides a one at terminal C, and the comparator circuit 36 provides a one at terminal B in response to the number in the FID memory 17 being one greater than the number in the output register 19.

Lines 22 through 26 illustrate the output caused by changing the number in the output register 19 to 011. In lines 22 through 24, it is shown, for instance, that for any position of the FID memory 17 holding 010 or less, a background color output is produced no matter what value is held at that position in the DSP memory 32. Most of the reasons for this are obvious since the FID memory 17 and the output register 19 hold unlike numbers and produce a zero at terminal A of the circuit 38. Even in the case where the DSP memory 32 holds a one in a position. The comparator 36 provides a zero at terminal B of the circuit 38 because the output register number is greater by one rather than less than the number in the FID memory 17.

Lines 25 and 26 illustrate that at any position of the FID memory 17 which holds 011, color information is transferred to the output display from the display memory because the number in the output register is the same.

Those skilled in the art will discern from the foregoing discussion that at each step of the operation of the system 30, the output logic of the system 30 furnishes the information provided by a display memory 13 or 14 both during the period in which the number in the output frame identification register 19 and that in the FID memory 17 are identical and during the period following when the next frame is being written to the other display memory so that the FID memory 17 is being overwritten.

Thus, the circuitry of the system 30 of this invention is capable of replacing that disclosed in FIG. 1 yet utilizes but half as much memory in the frame identification buffer portion as does the circuit of FIG. 1 to accomplish the same purpose. Moreover, since the FID memory 17 contains three bits at each position representing a pixel of the output display 12, the clearing of that memory may be done more rapidly than may the clearing of the memory for the system 10 illustrated in FIG. 1. In fact, since the FID memory contains but three bit positions while the FID memories of the circuit of FIG. 1 contains a total of eight bit positions, clearing may be accomplished in approximately one thirty-second of the time required to clear the circuitry of FIG. 1. This substantially enhances the rapidity with which frames may be presented at the output display 12.

FIG. 4 illustrates a truth table showing the output signals produced at the terminal D for operating the multiplexer 25 in response to the different signals provided at the terminals A, B and C of the output logic circuit 38. As may be seen when the signals at terminals A and B are both zeros, then no matter what signal is presented at terminal C, the output will display background color. When a 1 signal is produced at terminal A, then whatever signals are produced at terminals B and C, the output will display the color signal contained in the display memory. When terminals A and C are furnished zeros, while terminal B is furnished a 1, the output display will produce background color. When terminal A is furnished a zero, and terminals B and C are both furnished ones, then the output display will produce the color signals from the appropriate display memory on display 12.

Although the present invention has been described in terms of a preferred embodiment, it will be appreciated that various modifications and alterations might be made by those skilled in the art without departing from the spirit and scope of the invention. The invention should therefore be measured in terms of the claims which follow:

What is claimed is:

1. A computer output system for rapidly displaying a plurality of individual frames of information on display means including a display, comprising:

a first and second pixmapped display memories comprising a first and second plurality of pixel storage positions for storing a first and second frames of said frames of information;

a pixmapped frame identification memory comprising a third plurality of pixel storage positions simultaneously corresponding to said first and second pixel storage positions for storing a plurality of n-bit frame indications, each of said n-bit frame indication indicative of one of said individual frames of information;

input means coupled to said first and second display memories and said frame identification memory for alternately inputting said first frame and its n-bit frame indication into said corresponding first and third plurality of pixel storage positions, and said second frame and its n-bit frame indication into said corresponding second and third plurality of pixel storage positions;

comparison means coupled to said frame identification memory and said input means for comparing said n-bit indications stored in said third plurality of pixel storage positions, said n-bit indication in said input means and an indication indicative of a particular frame to be displayed on said display in a predetermined manner, and outputing enabling signals for said first and second plurality of pixel storage positions if said indications compare successfully under said predetermined manner at said corresponding third plurality of pixel storage positions; and control means coupled to said first and second display memories and said comparison means for selecting one of said first and second frames stored in said first and second plurality of pixel storage positions and displaying said frame information of said selected frame stored at said pixel storage positions based on said enabling signals.

2. The computer output system for rapidly displaying a plurality of individual frames of information on display means including a display as set forth in claim 1, wherein each of said first and second plurality of pixel storage positions comprises twenty four bits.

3. The computer output system for rapidly displaying a plurality of individual frames of information on display means including a display as set forth in claim 1, wherein each of said third plurality of pixel storage positions comprises three bits.

4. The computer output system for rapidly displaying a plurality of individual frames of information on display means including a display as set forth in claim 1, wherein said input means comprises an input frame identification register for storing said n-bit indication of said frame being input into one of said display memories.

5. The computer output system for rapidly displaying a plurality of individual frames of information on display means including a display as set forth in claim 1, wherein said comparison means comprises a logic circuit for outputing said enabling signals, said enabling signals being output under one of two conditions such that said enabling signals are output during clock cycles when said pixmapped frame identification memory is read for refreshing said display and during clock cycles when said pixmapped frame identification memory receives its input from said input means, whereby allowing said pixmapped frame identification memory to be shared by said first and second pixmapped display memories.

6. The computer output system for rapidly displaying a plurality of individual frames of information on display means including a display as set forth in claim 5, wherein said two conditions comprise a first condition that said logic circuit receives a first plurality of true inputs for said first and second plurality of pixel storage positions, during said clock cycles when said pixmapped frame identification memory is read for refreshing said display; and a second condition that said logic circuit receives a second and third plurality of true inputs for said first and second plurality of pixel storage positions, during said clock cycles when said pixmapped frame identification memory receives its input from said input means.

7. The computer output system for rapidly displaying a plurality of individual frames of information on display means including a display as set forth in claim 6, wherein said comparison means further comprises a first comparison circuit coupled to said pixmapped frame identification memory, an output frame identification register, and said logic circuit, for providing said logic circuit with said first plurality of true inputs during said clock cycles when said pixmapped frame identification memory is read for refreshing said display, said first plurality of true inputs being provided whenever said n-bit indications stored at said corresponding third plurality of pixel storage positions equal said n-bit indication indicative of a particular frame to be displayed, thereby resulting in said first plurality of true inputs being provided during said clock cycles when said pixmapped frame identification memory is read for refreshing said display, said n-bit indication indicative of a particular frame to be displayed being stored in said output frame identification register.

8. The computer output system for rapidly displaying a plurality of individual frames of information on display means including a display as set forth in claim 7, wherein said comparison means further comprises a second comparison circuit coupled to said pixmapped frame identification memory, said output frame identification register, and said logic circuit, for providing said logic circuit with said second plurality of true inputs during said clock cycles when said pixmapped frame identification memory receives its input from said input means, said second plurality of true inputs being provided whenever said n-bit indications stored at said corresponding third plurality of pixel storage positions equal said n-bit indication indicative of a particular frame to be displayed stored in said output frame identification register plus one, thereby resulting in said second plurality of true inputs being provided during said clock cycles when said pixmapped frame identification memory receives its input from said input means.

9. The computer output system for rapidly displaying a plurality of individual frames of information on display means including a display as set forth in claim 8, wherein said comparison means further comprises a pixmapped display select plane memory means coupled to said logic circuit for storing and providing said third plurality of true inputs, during clock cycles when said pixmapped frame identification memory receives its input from said input means, said pixmapped display select plane memory means comprising a fourth plurality of pixel storage positions corresponding to said third plurality of pixel storage positions for storing said third plurality of true inputs to be provided to said logic circuit.

10. The computer output system for rapidly displaying a plurality of individual frames of information on display means including a display as set forth in claim 9, wherein each of said fourth plurality of pixel storage positions comprises one bit.

11. The computer output system for rapidly displaying a plurality of individual frames of information on display means including a display as set forth in claim 9, wherein said comparison means further comprises a third comparison circuit coupled to said pixmapped frame identification memory and said input means for setting said third plurality of true inputs stored in said fourth plurality of pixel storage positions during said clock cycles when said pixmapped frame identification memory receives its input from said input means, said third plurality of true inputs stored in said fourth plurality of pixel storage positions being set whenever said n-bit indications stored at said corresponding third plurality of pixel storage positions equal said n-bit indication in said input means minus one, thereby resulting in said third plurality of true inputs being provided during said clock cycles when said pixmapped frame identification memory receives its input from said input means.

* * * * *

UNITED STATES PATENT AND TRADEMARK OFFICE
CERTIFICATE OF CORRECTION

PATENT NO. : 5,050,102

DATED : September 17, 1991

INVENTOR(S) : Sun et al.

It is certified that error appears in the above-identified patent and that said Letters Patent is hereby corrected as shown below:

On the title page item 54 and column 1 at line 3, please delete " GENTIFICATION " and insert -- IDENTIFICATION --.

In column 7 at line 14, please delete " inout " and insert -- input --.

In column 12, claim 1 at line 3, please delete " indication " and insert -- indications --.

Signed and Sealed this

Tenth Day of June, 1997

Attest:

Bruce Lehman

BRUCE LEHMAN

*Attesting Officer*

*Commissioner of Patents and Trademarks*